(12) United States Patent
Kiforiuk et al.

(10) Patent No.: US 8,857,283 B2
(45) Date of Patent: Oct. 14, 2014

(54) BALL SCREW

(75) Inventors: Alexander Kiforiuk, Ebersbach an der Fils (DE); Dennis Kontner, Goppingen (DE); Jules Ngamga Nzepa, Schwaikheim (DE); Philippe Steck, Belp (CH)

(73) Assignee: ThyssenKrupp Presta AG, Eschen (LI)

( * ) Notice: Subject to any disclaimer, the term of this patent is extended or adjusted under 35 U.S.C. 154(b) by 0 days.

(21) Appl. No.: 13/991,723

(22) PCT Filed: Nov. 16, 2011

(86) PCT No.: PCT/EP2011/005765
§ 371 (c)(1),
(2), (4) Date: Jun. 5, 2013

(87) PCT Pub. No.: WO2012/076114
PCT Pub. Date: Jun. 14, 2012

(65) Prior Publication Data
US 2013/0247701 A1 Sep. 26, 2013

(30) Foreign Application Priority Data

Dec. 10, 2010 (DE) .......... 10 2010 054 134

(51) Int. Cl.
| | | |
|---|---|---|
| F16H 1/24 | (2006.01) | |
| F16H 3/06 | (2006.01) | |
| F16H 27/02 | (2006.01) | |
| F16H 29/02 | (2006.01) | |
| F16H 29/20 | (2006.01) | |
| F16H 55/02 | (2006.01) | |
| B62D 5/04 | (2006.01) | |
| F16H 25/22 | (2006.01) | |
| F16H 55/36 | (2006.01) | |

(52) U.S. Cl.
CPC ............ *F16H 25/2214* (2013.01); *F16H 55/36* (2013.01); *B62D 5/0448* (2013.01)
USPC ..................................... 74/89.23; 74/424.82

(58) Field of Classification Search
CPC .... F16H 55/36; F16H 25/2214; B62D 5/0448
USPC ............... 74/424.71, 424.82, 424.86, 424.96, 74/89.23; 180/444
See application file for complete search history.

(56) References Cited

U.S. PATENT DOCUMENTS 7,694,600 B2 * 4/2010 Osterlaenger et al. ...... 74/424.82
2004/0009818 A1 * 1/2004 Son ................................ 464/32
(Continued)

FOREIGN PATENT DOCUMENTS

DE 10056275 A1 5/2002
DE 102004055423 A1 5/2006
(Continued)

OTHER PUBLICATIONS

International Search Report and Written Opinion issued in PCT/EP2011/005765, mailed date Jan. 30, 2012, with English translation of International Search Report.

(Continued)

*Primary Examiner* — Troy Chambers
*Assistant Examiner* — Jake Cook
(74) *Attorney, Agent, or Firm* — Panitch Schwarze Belisario & Nadel LLP

(57) ABSTRACT

Ball screw comprising a ball nut (1), which is rotatably mounted on a threaded shaft and on the inner circumference of which at least one ball thread (2) wound around an axis (8) in a coil shape is provided for balls (3) to roll on, wherein at least one recirculating element (5), which is arranged on the outer circumference of the ball nut (1) and which is provided with a recirculating channel for the balls (3), connects a start of a coil to an end of a coil of the ball thread by means of the two ends of the recirculating element in order to enable endless recirculation of the balls (3), wherein the ball nut (1) is provided with a flange (6) for fastening a belt pulley (15) and with a bearing seat (9), and a sleeve (12) pushed onto the ball nut is provided with a perfectly cylindrical outer circumferential surface, which outer circumferential surface secures the recirculating element (5) on the ball nut (1) and surrounds the ball nut (1) in a tubular shape between the flange (6) and the bearing seat (9).

10 Claims, 4 Drawing Sheets

(56) References Cited

U.S. PATENT DOCUMENTS

| | | | |
|---|---|---|---|
| 2006/0048592 A1* | 3/2006 | Ung | 74/89.23 |
| 2007/0137968 A1* | 6/2007 | Lehmann | 192/45 |
| 2007/0227804 A1* | 10/2007 | Fukuda et al. | 180/444 |
| 2010/0064837 A1* | 3/2010 | Osterlaenger et al. | 74/424.87 |

FOREIGN PATENT DOCUMENTS

| | | |
|---|---|---|
| DE | 102004058963 A1 | 6/2006 |
| DE | 102005023274 A1 | 11/2006 |
| DE | 102006053244 A1 | 5/2008 |
| DE | 102007026605 A1 | 12/2008 |
| DE | 102007049114 A1 | 4/2009 |

OTHER PUBLICATIONS

International Preliminary Report on Patentability and Written Opinion issued in PCT/EP2011/005765, date of issuance Jun. 12, 2013.

* cited by examiner

BALL SCREW

CROSS-REFERENCE TO RELATED APPLICATIONS

This Application is a National Stage PCT International Application No. PCT/EP2011/005765, filed on Nov, 16, 2011 and claims priority of German Patent Application No. 10 2010 054 134.6 filed on Dec. 10. 2010. The disclosures of the aforementioned applications are incorporated herein in their entirety by reference.

The present invention relates to a ball screw having the features of the preamble of claim 1.

Ball screws convert rotational motion into steering motion. Ball screws are increasingly used in automotive electromechanical power steering in rack and pinion steering systems. In such power steering systems or servo drives, the steering rack is configured in sections as a ball screw shaft. An electric motor drives the corresponding ball nut via a toothed drive belt or another drive mechanism thus providing electromotive support for the longitudinal displacement of the steering rack.

A ball screw having a ball screw nut arranged on a ball screw shaft on the inner circumference of which ball grooves are provided as a raceway for balls to roll on is known from DE 10056275 A1. A recirculating element provided with a recirculating channel for balls is arranged on the outer circumferences of the ball screw nut. Said recirculating element connects a start of a coil to an end of a coil by means of the two ends of the recirculating element in order to enable the endless circulation of the balls. The recirculating element is arranged in a recess of the clamping flange and held in a radial direction. Said clamping flange is permanently connected to the ball screw nut. Said recess of the clamping flange can be configured slightly larger in order to enable radial clearance between the clamping flange and the recirculating element. Said radial clearance may be required in order to take account of manufacturing tolerances. The recirculating element protrudes over the outer surface of the ball nut resulting in a non-circular outer contour. When used in an automotive steering system, the threaded shaft is mounted in a steering housing in a torque proof and axially displaceable manner. The ball nut rotates during operation under the influence of the electric motor and the threaded shaft. Problematic in this embodiment of a ball screw is that if elements of the mechanism break, in the case of belt drives, particularly if the belt or the belt pulley breaks, elements may end up in the recirculating region of the ball nut, get jammed between the ball circulation and the steering housing and block the rotation. This leads not only to the malfunction of the power assisted steering system, but also to a blocking of the entire automotive steering system. This is undesirable for safety reasons.

A ball screw with a ball nut wherein the plastic recirculating elements are inserted from outside into the base body of the ball nut is known from DE 10 2004 055 423 A1. The recirculating elements protrude over the outer circumference of the metallic base body of the ball nut. A drive pulley for attaching the recirculating elements onto the ball nut is configured such that with its gear teeth, it is larger than the outer circumference of the recirculating elements and recesses are provided in its interior for the recirculating elements. The drive pulley can be put over the ball nut and, in particular, over the recirculating elements. The outer cover for the recirculating elements is secured by the tooth segment of the drive pulley, however not completely. Sections protruding over the surface of the ball nut, which protrude as projections over the ball nut, remain uncovered. If the belt snaps there is the possibility that parts of the belt will end up between the base body and the recirculating element and then prevent the rotation of the ball nut such that said parts become jammed between the recirculating element and the steering housing. The snapping of the belt can also lead to a blocking of the steering in this case and consequently not only the power assisted steering system fails, but it also becomes impossible to steer the vehicle.

The object of the present invention is therefore to create a ball screw wherein if the belt snaps, there is a greater likelihood that the vehicle will remain steerable, and which ball screw is easy to manufacture and fit.

This object is solved by a ball screw having the features of claim 1.

Since the ball nut has a connecting region for attaching a belt pulley at one end and a bearing seat at the other end, as well as a sleeve pushed onto the ball nut, which secures a recirculating element onto the ball nut and which surrounds the region in a tubular shape between the connection for the belt pulley and the bearing seat, and since the sleeve has three curved, resilient supporting regions on its inner surface, which are equiangularly distributed over the inner circumference, and which each abut the outer surface of the ball nut in a circumferential direction over a peripheral angle of 40° to 60°, it is particularly suitable for compensating for the different thermal expansion of the ball nut made of metal and the sleeve made of injection moulded plastic, for example. Said configuration of the sleeve also makes centric fitting using simple means possible, wherein fitting is relatively insensitive to manufacturing tolerances and can therefore also be performed manually without excessive effort.

The sleeve is preferably configured as a single piece and has contact surfaces on its inner surface which abut a sliding seat in a frictionally engaged manner on the outer surface of the ball nut. This facilitates manufacture since the sleeve can simply be pushed onto the ball nut manually during manufacture.

The recirculating element for returning the balls is preferably made from a U-shaped metal tube. Such a recirculating element is a single piece and can be inserted into tangential bores of the ball nut which penetrate the raceway at both ends. The sleeve preferably has an interior recess, which is at a distance from the surface of the ball nut, such that the recirculating element sits firmly in said recess if the sleeve is pushed onto the ball nut. This also simplifies manufacture since the circulating element only has to be inserted into both bores and the sleeve can then be pushed onto the ball nut wherein the ball nut inevitably secures the recirculating element in its seat.

The connection for the belt pulley is preferably configured as a flange on the front side of the ball nut facing the bearing seat. Here the belt pulley is connected to the ball nut in a torque proof manner on the front side of the flange using attachment means. The outer diameter of the flange corresponds preferably to the outer diameter of the sleeve and consequently, when the sleeve is pushed on, a barrel-shaped outer surface is created which substantially has a constant diameter over the axial extension of the device. In a preferred embodiment, the belt pulley is pressed coaxially onto the outer circumference of the flange region and projects over the end of the sleeve adjacent to the flange region. It is an advantage here if a smaller gap, preferably 0.1-1 mm wide, is provided between the sleeve and the inner surface of the belt pulley. This gap is so small that any fragments that are bigger than a corresponding size will not be able to get through. Contact with the sleeve and the belt pulley will also be avoided. At the end of the sleeve facing away from the flange, the sleeve ends at a short distance from a roller bearing which supports the ball nut in the steering housing. The distance is also short here, preferably in the region of 0.1 and 1 mm. This guarantees that no parts that are bigger than the width of the gap are able to get into the space between. Fragments of gear parts, drive belts or similar that are smaller than this may get through the gap. This is not detrimental, however, since said fragments in the circular gap are not able to block the ball nut in relation to the steering housing.

An embodiment of the present invention is described in greater detail below based on the drawings.

Figure 1:
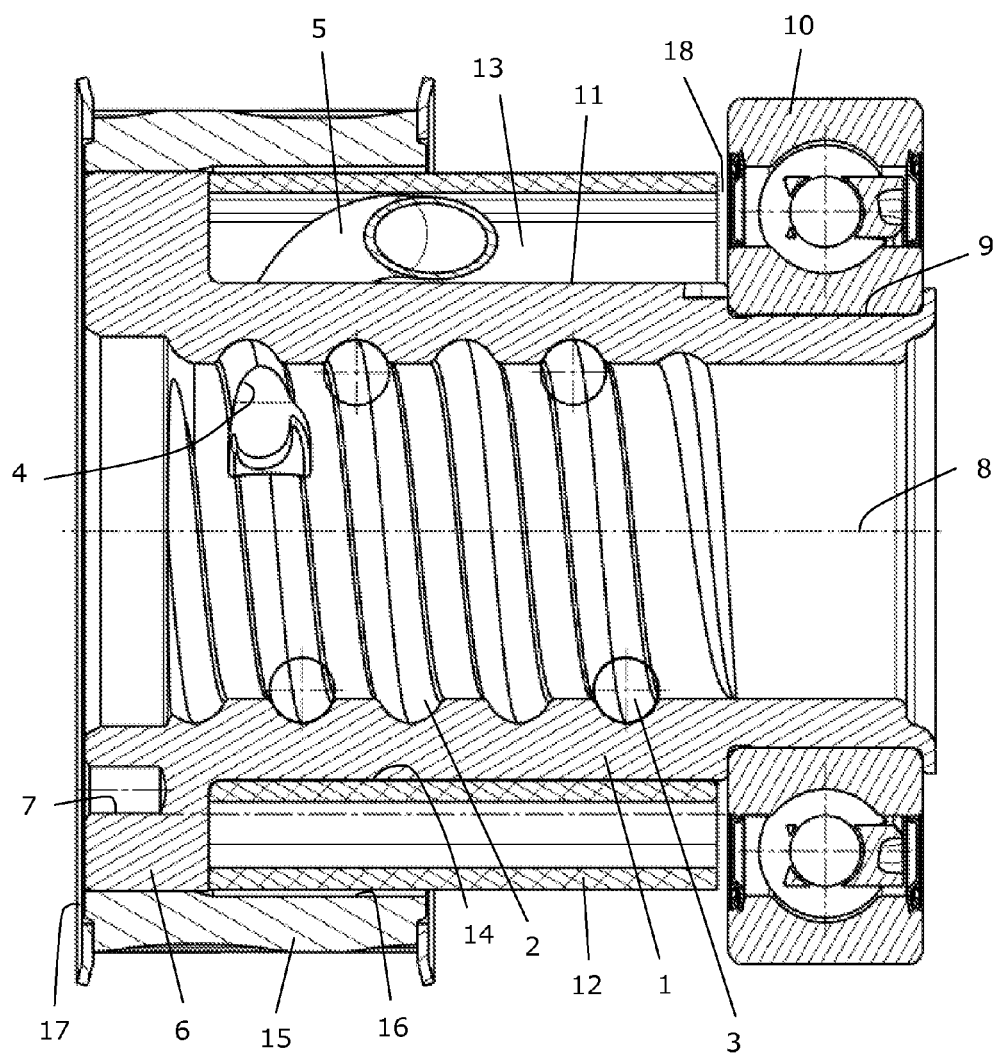
FIG. 1 shows a longitudinal section of a ball circulation with sleeve and belt pulley.

FIG. 1 shows a longitudinal section of a ball nut 1 which supports a ball screw 2 on its inner surface. Schematically indicated balls 3 recirculate here in the ball screw 2 in a manner known per se. A bore 4 is provided in each case for the entry or exit of balls for return to the opposite end of the screw thread 2. A tubular recirculating element 5 is inserted into the bore 4. The recirculating element 5 is U-shaped or stirrup-shaped and sits with its second, non-visible end in a corresponding bore which is arranged on the other end of the raceway 2. A larger in diameter flange 6 is provided on the left front side in FIG. 1, threaded holes 7 are positioned on the front side of said flange parallel to an axis 8 of the ball nut 1. The opposite end of the ball nut 1 is provided with a bearing seat 9 on which a roller bearing 10 sits. The roller bearing 10 is provided for the purpose of supporting the ball nut 1 in a steering housing.

The ball nut 1 is configured substantially rotation symmetrically and in the region where the recirculating element 5 sits, has a perfectly cylindrical outer peripheral surface, which is oriented coaxially to the axis 8. The flange region 6 is also configured rotation symmetrically and has a larger outer diameter.

A sleeve 12 is put over the ball nut 1 from the side of the bearing seat 9 and surrounds the area 11 almost completely. An inner recess 13 of the sleeve 12 is dimensioned such that the recirculating element 5 sits without clearance between the ball nut 1 and the sleeve 12. The sleeve 12 itself is centred by a contact surface 14 on the area 11 of the ball nut 1. Two further two-dimensional supports, which cannot be seen in this diagram, secure the centric seating of the sleeve 12.

A belt pulley 15 is attached to the flange region 6. The belt pulley 15 is configured to be annular in shape and sits tightly on the outer circumference of the flange region 6. The belt pulley 15 projects over the flange region 6 in the direction of the sleeve 12. Where the belt pulley 15 projects over the sleeve 12, the inner diameter of the belt pulley 15 increases. A small gap 16 forms between the inner peripheral surface of the belt pulley 15 and the outer surface of the sleeve 12 and consequently these elements do not come into contact with one another. On the front side, the belt pulley 15 is provided with a disc 17 which is screwed into the bores 7 in the ball nut 1 by means of threaded screws.

Figure 2:
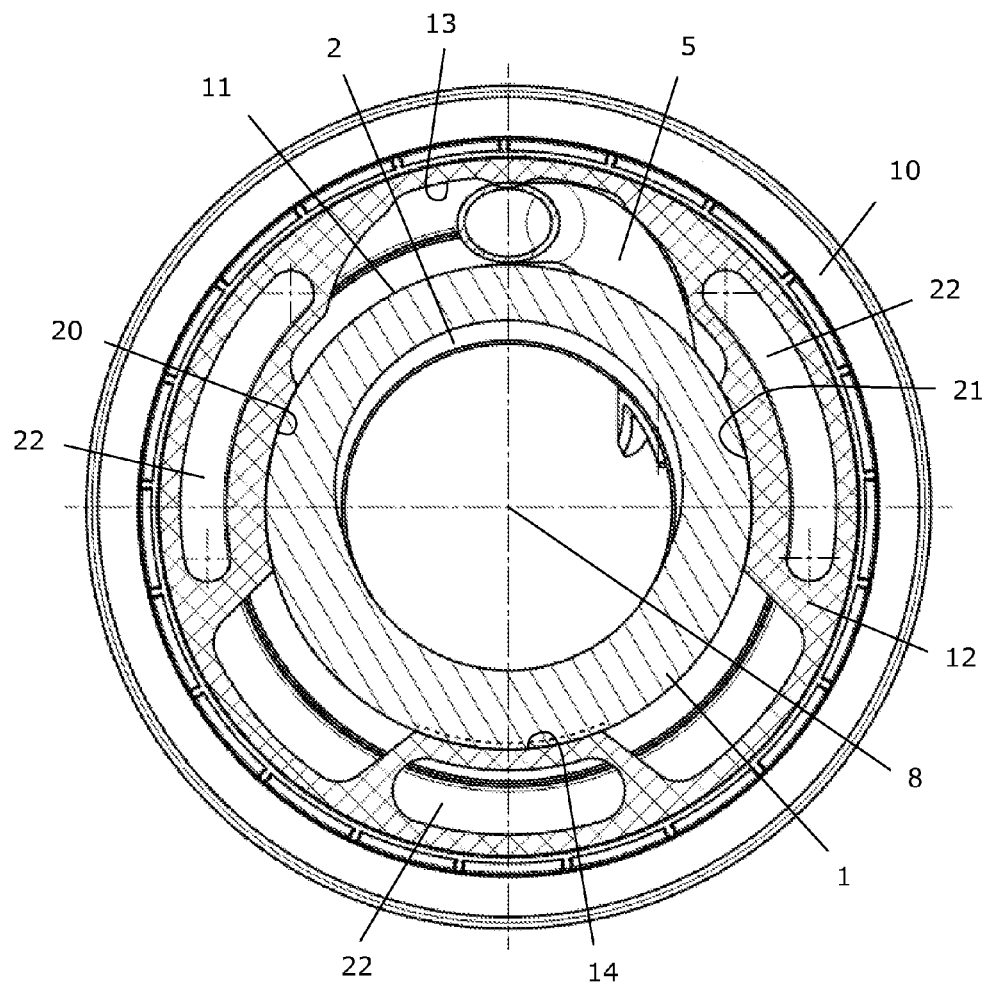
FIG. 2 shows the ball circulation from FIG. 1 in a cross-section along line II-II from FIG. 4.

After the recirculating element 5 and the sleeve 12 have been fitted, the roller bearing 10 is placed on the seat 9 and secured there during manufacture. The sleeve 12 is dimensioned in an axial direction in this region such that a smaller gap 18 is formed which ensures that the sleeve 12 does not come into contact with the bearing 10. FIG. 2 shows a cross-section of the device from FIG. 1. The same elements have the same reference signs. In the region of the raceway 2, the ball nut 1 is provided with the outer barrel-shaped area 11 and circular cross-section. The sleeve 12 abuts the contact surface 14 on the surface. Two further contact surfaces 20 and 21 are provided for the tight, frictionally engaged seating of the sleeve 12 on the area 11. The contact surfaces 14, 20 and 21 are distributed over the circumference of the ball nut 1. They each extend over approx. 50° of the circumference and there is a space between the surface 14 and the surface 20 of approx. 50°. A free space in the circumferential direction of approx. 50° is also provided between the surface 14 and the surface 21. The region of the recess 13 in which the tubular-shaped recirculating element 5 is enclosed, is slightly larger in the circumferential direction than the areas described above. The recess 13 extends in a circumferential direction of the outer surface of the ball nut 1 over approx. 110°.

The sleeve 12 is provided with recesses 22 between its outer peripheral surface, which is completely closed and configured as perfectly cylindrical and the contact surfaces 14, 20 and 21. Said recesses enable an elastic resilience of the contact surfaces 14, 20 and 21 in a radial direction and ensure that even in the event of temperature fluctuations, as are to be expected during motor vehicle steering operation, the sleeve 12 sits tightly and noiselessly on the ball nut 1. In this design, the manufacturing tolerances of both these parts are uncritical.

Figure 3:
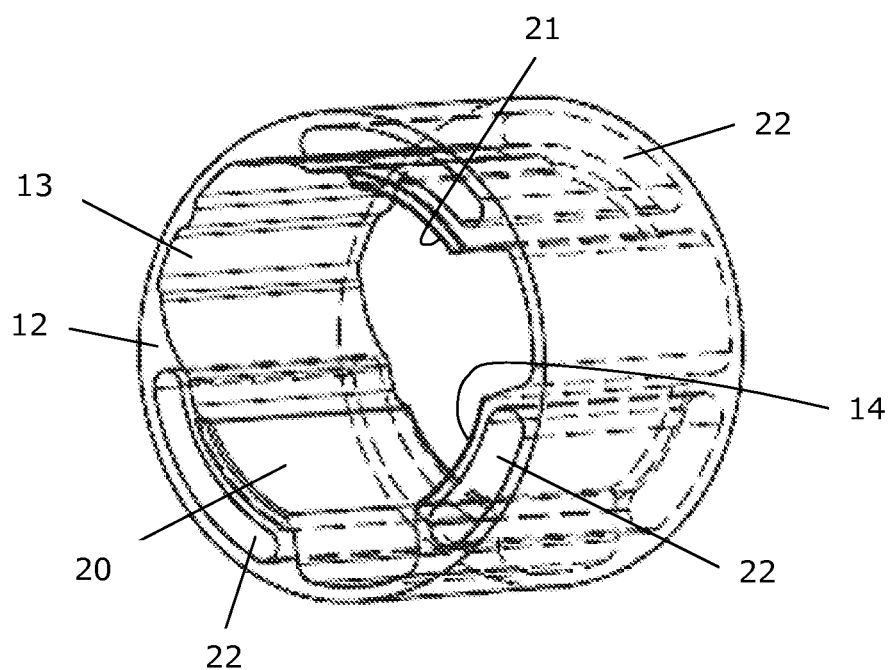
FIG. 3 shows a perspective representation of the sleeve from FIG. 1 and FIG. 2.

FIG. 3 shows a perspective representation of the sleeve 12. The same parts have the same reference signs. It can be seen in this diagram that the sleeve 12 has a closed perfectly cylindrical outer surface without recesses or projections. This design guarantees that the sleeve 12 cannot be blocked by any adjacent fragments of damaged gear parts of the servo-drive vis-à-vis the steering housing surrounding the ball nut which is not shown.

Figure 4:
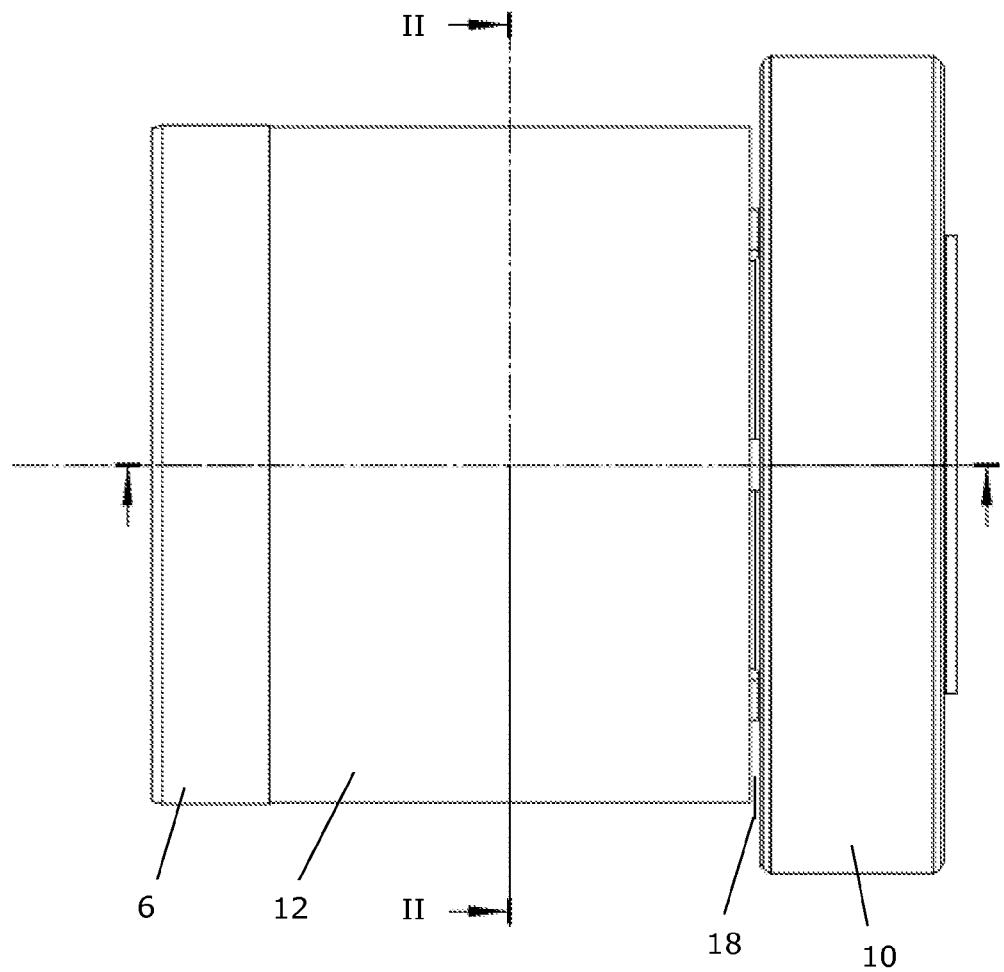
FIG. 4 shows side view of the arrangement from FIG. 1 with the belt pulley removed.

Finally, FIG. 4 shows a side view corresponding to the diagram in FIG. 1, however without a sectional view. The line II-II characterises the position of the sectional view which is shown in FIG. 2. The belt pulley 15 is not fitted in this diagram. It can be seen that the components consisting of ball nut having the perfectly cylindrical flange region 6 and the sleeve 12 have a completely smooth outer peripheral surface which is free from any recesses or projections. Even the gap 18 between the sleeve 12 and the roller bearing 10 is rotation symmetrical and consequently here too ingressing components are not able to become wedged together vis-à-vis the box surrounding the outside of the housing. This design guarantees that if the drive components break in the region of the servo-drive, in particular also if the belt pulley 15 itself breaks, no blocking of the ball circulation can occur vis-à-vis the steering housing. Although the automotive steering system is then without a servo-drive, it can be operated manually as before because the ball circulation and the entire shaft drive are neither self-locking nor able to be blocked by any fragments that may have accumulated in the peripheral region of the ball nut 1. The ball nut 1 with the sleeve 12 can then also rotate due to its completely smooth outer surface if it is surrounded by fragments of any material and dimensions in the steering housing.

In this manner an automotive steering system is created which is also operationally reliable if servo-drive elements break and which is also easy to manufacture in the manner described and using a small number of parts.

REFERENCE SIGNS

1. Ball nut
2. Ball screw
3. Ball
4. Bore
5. Recirculating element
6. Flange
7. Threaded holes 8. Axis
9. Bearing seat
10. Roller bearing
11. Area
12. Sleeve
14. Contact surface
15. Belt pulley
16. Gap
17. Disc
18. Gap
20. Surface
21. Surface
22. Projections

What is claimed is:

1. A ball screw comprising:
a ball nut, which is rotatably mounted on a threaded shaft, and having at least one ball thread wound around an axis in a coil shape on an inner circumference for balls to roll on, wherein the ball nut is provided with a flange for fastening a belt pulley and with a bearing seat,
at least one recirculating element arranged on an outer circumference of the ball nut, which is provided with a recirculating channel for the balls, and which is configured to connect a start of a coil to an end of a coil of the ball thread by means of two ends of the recirculating element in order to enable endless recirculation of the balls,
and
a sleeve configured to be pushed onto the ball nut, the sleeve having a cylindrical outer circumferential surface, which outer circumferential surface is configured to secure the recirculating element on the ball nut and to surround the ball nut in a tubular shape between the flange and the bearing seat, wherein the sleeve has three curved, resilient supporting regions on its inner surface, which are equiangularly distributed over the inner circumference, and which abut an outer surface of the ball nut in a circumferential direction over a peripheral angle of between 40° and 60°.

2. The ball screw according to claim 1, wherein the sleeve is configured as a single piece and has contact surfaces on its inner surface that abut a sliding seat in a frictionally engaged manner on the outer surface of the ball nut.

3. The ball screw according to claim 1, wherein the recirculating element is manufactured as a single piece from a U-shaped metal tube.

4. The ball screw according to claim 1, wherein the sleeve has an inwardly lying recess located at a distance from the outer surface of the ball nut such that the recirculating element sits tightly in said recess.

5. The ball screw according to claim 1, wherein a connection for the belt pulley is configured on a front side of the ball nut facing away from the bearing seat.

6. The ball screw according to claim 1, wherein the belt pulley is configured to be connected to the ball nut in a torque proof manner on a front side of the flange using attachment means.

7. The ball screw according to claim 1, wherein an outer diameter of the flange is equal to an outer diameter of the sleeve.

8. The ball screw according to claim 1, wherein the belt pulley is pressed coaxially onto the outer circumference of the flange and projects over an end of the sleeve adjacent to the flange.

9. The ball screw according to claim 1, wherein, at an end of the sleeve facing away from the flange, the sleeve ends at a short distance from a roller bearing configured to support the ball nut in a steering housing.

10. The ball screw according to claim 1, wherein a gap having a radial width of between 0.1 and 1 mm is provided between the sleeve and an inner surface of the belt pulley.

* * * * *